(12) United States Patent
Barnholt

(10) Patent No.: US 9,133,892 B2
(45) Date of Patent: Sep. 15, 2015

(54) ISOLATION OF CLUTCH DEPARTURE CONTROL SLEEVE

(75) Inventor: Mark C. Barnholt, Fort Wayne, IN (US)

(73) Assignee: Eaton Corporation, Cleveland, OH (US)

( * ) Notice: Subject to any disclaimer, the term of this patent is extended or adjusted under 35 U.S.C. 154(b) by 1817 days.

(21) Appl. No.: 12/326,013

(22) Filed: Dec. 1, 2008

(65) Prior Publication Data

US 2010/0133057 A1    Jun. 3, 2010

(51) Int. Cl.
*F16D 13/75* (2006.01)

(52) U.S. Cl.
CPC ..................... *F16D 13/757* (2013.01)

(58) Field of Classification Search
CPC .............................. F16D 13/75; F16D 13/757
USPC .............. 192/70.252, 111.18, 111.19, 70.18, 192/30 W
See application file for complete search history.

(56) References Cited

U.S. PATENT DOCUMENTS

| 2,385,517 | A |   | 9/1945  | Hunt |  |
|---|---|---|---|---|---|
| 3,938,636 | A |   | 2/1976  | Nerska |  |
| 5,238,093 | A | * | 8/1993  | Campbell | 192/30 W |
| 5,404,979 | A | * | 4/1995  | Craft et al. | 192/70.252 |
| 5,531,308 | A | * | 7/1996  | Gochenour et al. | 192/70.252 |
| 5,564,540 | A | * | 10/1996 | Zelikov | 192/70.252 |
| 5,566,804 | A |   | 10/1996 | Gochenour et al. |  |
| 5,941,356 | A | * | 8/1999  | Weiss et al. | 192/70.252 |
| 6,050,381 | A |   | 4/2000  | Uehara et al. |  |
| 6,070,708 | A |   | 6/2000  | Fukuda et al. |  |
| 6,193,039 | B1| * | 2/2001  | Doremus et al. | 192/70.252 |
| 6,264,019 | B1| * | 7/2001  | Uehara | 192/111.19 |
| 6,347,694 | B1|   | 2/2002  | Szadkowski et al. |  |
| 6,820,731 | B2| * | 11/2004 | Abusamra et al. | 192/70.252 |
| 8,042,673 | B2| * | 10/2011 | Adams | 192/70.252 |

FOREIGN PATENT DOCUMENTS

| DE | 19755713 A1 | 6/1998 |
|---|---|---|
| EP | 1132639 A2  | 9/2001 |

OTHER PUBLICATIONS

International Search Report for PCT/IB2009/007610.

* cited by examiner

*Primary Examiner* — Gene Crawford
*Assistant Examiner* — Terry Chau
(74) *Attorney, Agent, or Firm* — Fishman Stewart Yamaguchi PLLC

(57) ABSTRACT

A torque transmitting apparatus includes a cover portion generally defined by a first axis. The cover portion includes a plurality of adjustment apertures. The apparatus also includes a flywheel coupled to the cover portion for rotation therewith, wherein the flywheel is restrained from axial movement relative to the cover portion. The apparatus also includes a pressure plate coupled to the cover portion for rotation therewith. The pressure plate is axially moveable relative to the cover portion. The apparatus also includes a clutch disk at least partially interposed between the flywheel and the pressure plate. The apparatus also includes a plurality of first members extending between the pressure plate and the cover. Each first member exerts a biasing outward radial force on the adjustment aperture to resist axial movement therebetween. The apparatus also includes a plurality of biasing members. At least one biasing member is interposed between one of the first members and the flywheel. Each biasing member exerts a biasing axial force on the pressure plate thereby biasing the pressure plate toward the flywheel while absorbing undesirable impact forces to isolate the departure control sleeves.

10 Claims, 10 Drawing Sheets

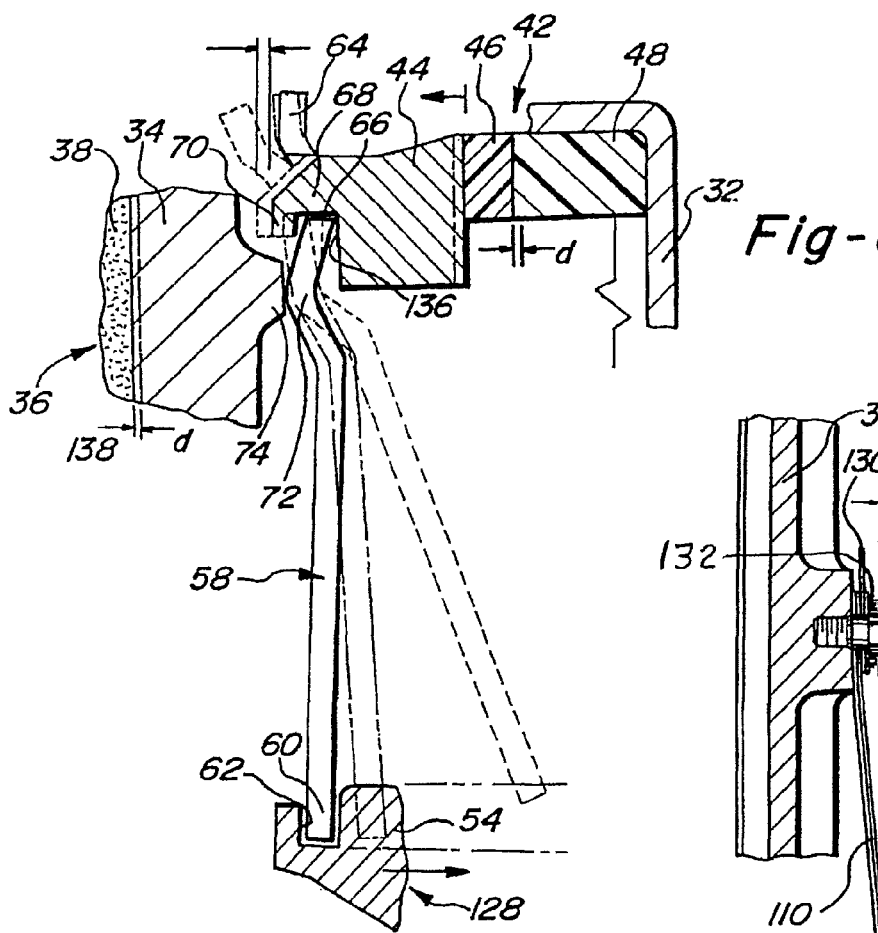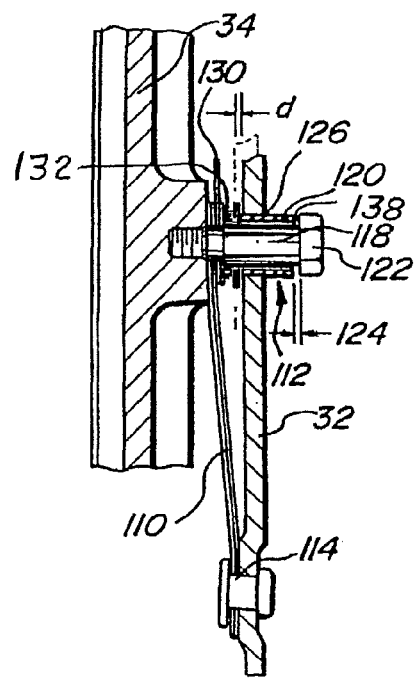

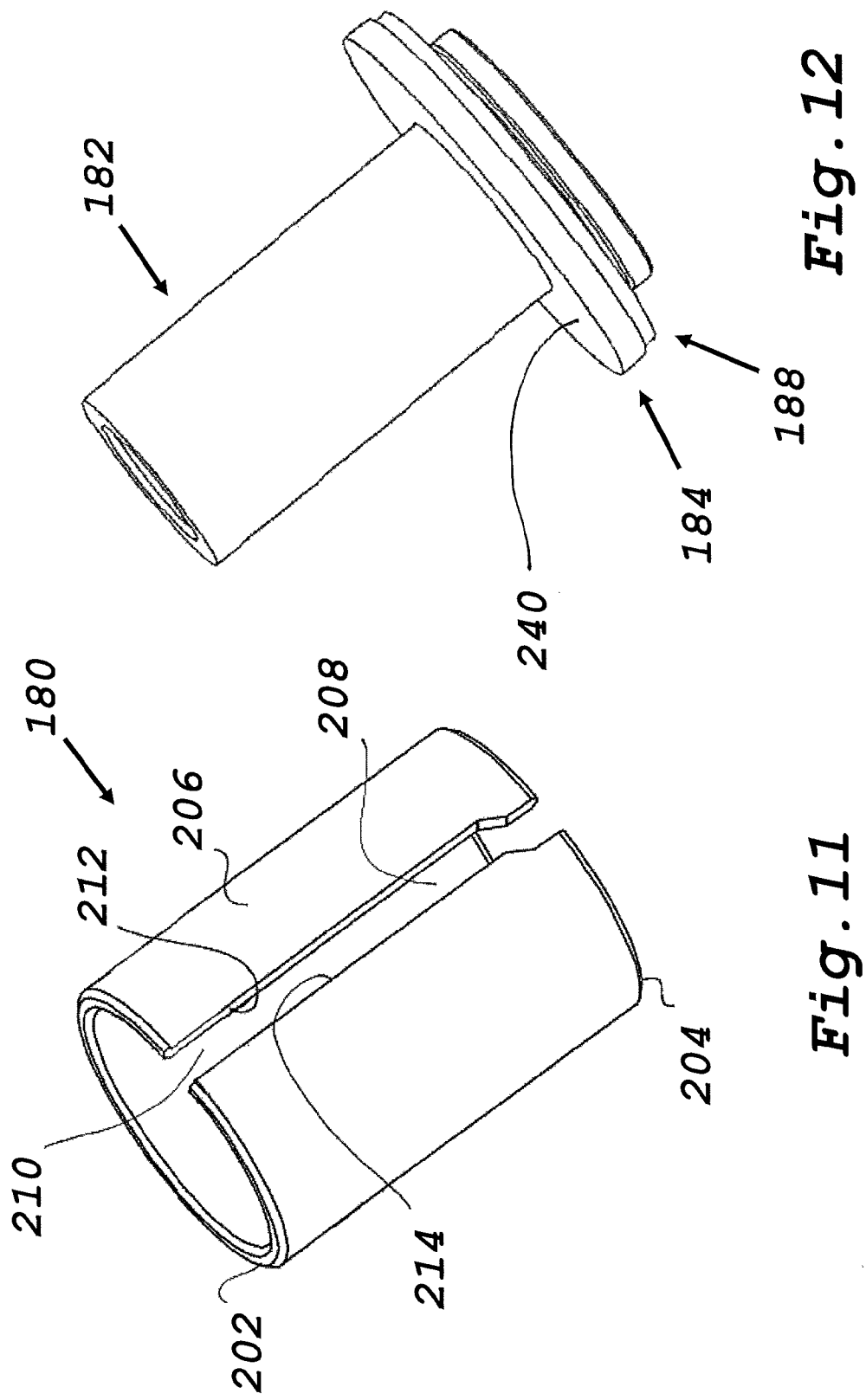

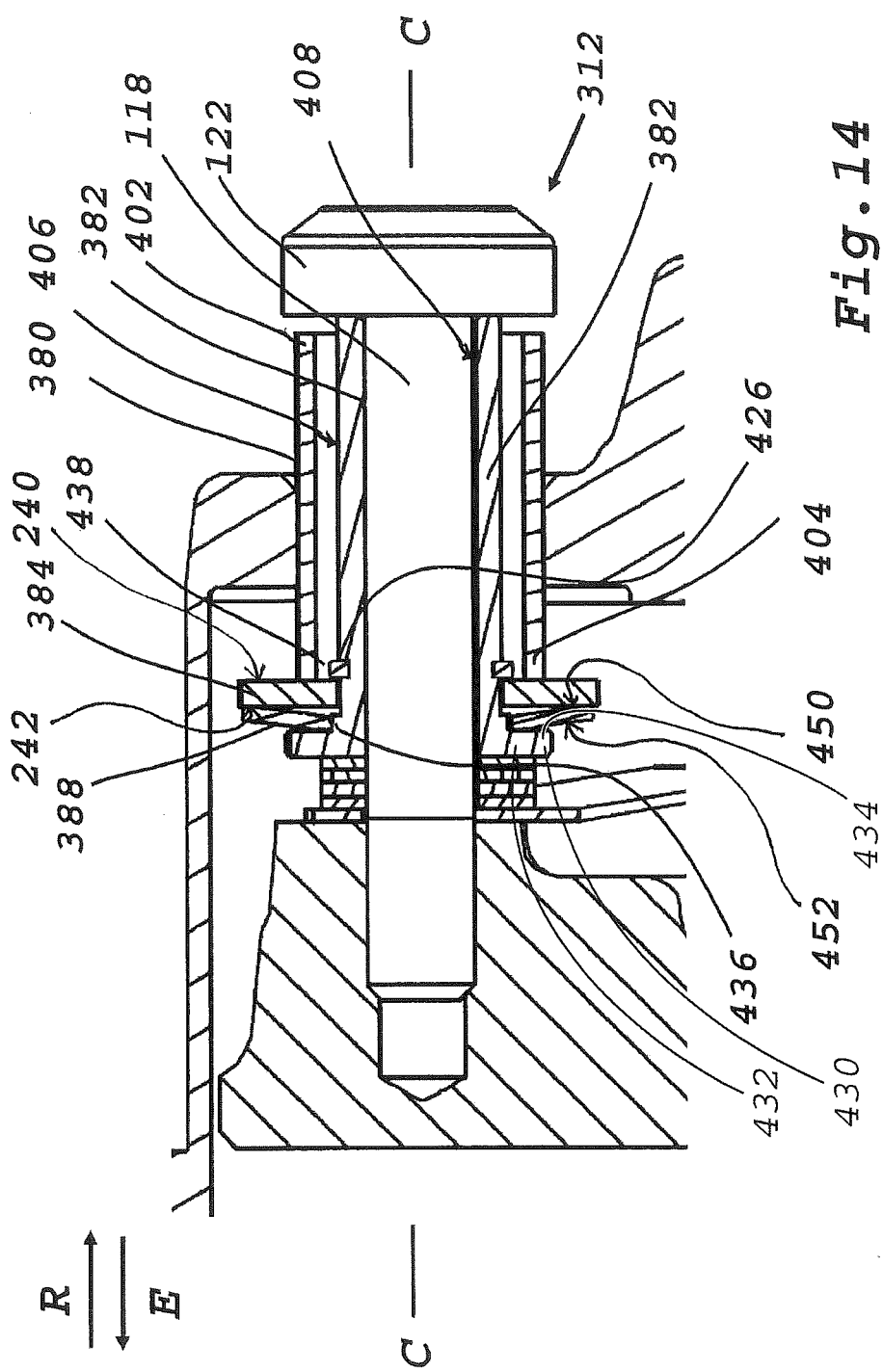

ISOLATION OF CLUTCH DEPARTURE CONTROL SLEEVE

TECHNICAL FIELD

The disclosure generally relates to self-adjusting clutches for transmitting torque in automobiles and especially commercial trucks with automated manual transmissions.

BACKGROUND

A friction clutch or brake includes an engaging member having a friction surface that wears over the life of the device. In order for the friction torque device to continue operating effectively, the relative position of the engaging members must be adjusted or realigned to compensate for wear that occurs on the friction surface.

More specifically, in a friction clutch, torque is transmitted from a driving member to a driven member, each member rotating about an axis. The driven member is interposed between the driving member and a pressure plate. In normal operation, a release assembly cooperates with the pressure plate to selectively move the pressure plate axially towards the driven member in order to engage and disengage the clutch. As wear occurs on a friction surface of the driven member, the pressure plate must be moved an additional axial increment to engage the driven member with the driving member. The relative position of the pressure plate must therefore be compensated internally for this additional increment of movement.

With most heavy duty friction clutches, the adjustment of a release bearing and spring assembly is manually achieved in order to compensate for wear on the friction surface of the driven member. Manual adjustment, however, requires continuous monitoring to determine if adjustment is necessary, as well as manpower to perform the adjustment. If the adjustment is not completed timely, the clutch will operate less effectively.

It is also known in the art to provide a clutch with an automatic adjustment mechanism. While a number of such mechanisms do compensate for wear, numerous parts are typically required for the desired result. Further, the operative parts are frequently disposed outside the cover of the clutch, thereby subjecting the parts to possible damage and an increased likelihood of breakdown. More significantly, prior art automatic adjustment mechanisms often do not fully, or timely compensate for wear on the friction surface. This is due, in part, to incomplete adjustment, or delayed adjustment after the friction surface has worn.

Accordingly, a need exists to provide a friction torque device with an automatic adjustment mechanism which has a simple structure with a minimum of interconnected parts, wherein the parts are disposed within a housing or cover for the device. A desirable adjustment mechanism may also provide an automatic adjustment mechanism that directly and effectively adjusts the friction torque device during normal operation while not reducing the operability of the clutch. The self-adjusting clutch may also have enduring performance when subjected to the frequent and rapid actuations prevalent with transmissions having automated shifting.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

FIG. 7 is a partial sectional view of the automatically adjusting clutch, including a connection pin assembly, taken along line 7-7 of FIG. 6.

FIG. 8 is an enlarged partial cross-sectional view of a portion of the automatically adjusting clutch.

FIG. 11 is a perspective view of a control sleeve, according to an embodiment.

FIG. 12 is a perspective view of a flanged sleeve, reaction member, and biasing member according to an embodiment.

FIG. 14 is an enlarged view of an alternative embodiment of area 10 of FIG. 3, according to an embodiment.

DETAILED DESCRIPTION

Figure 1:
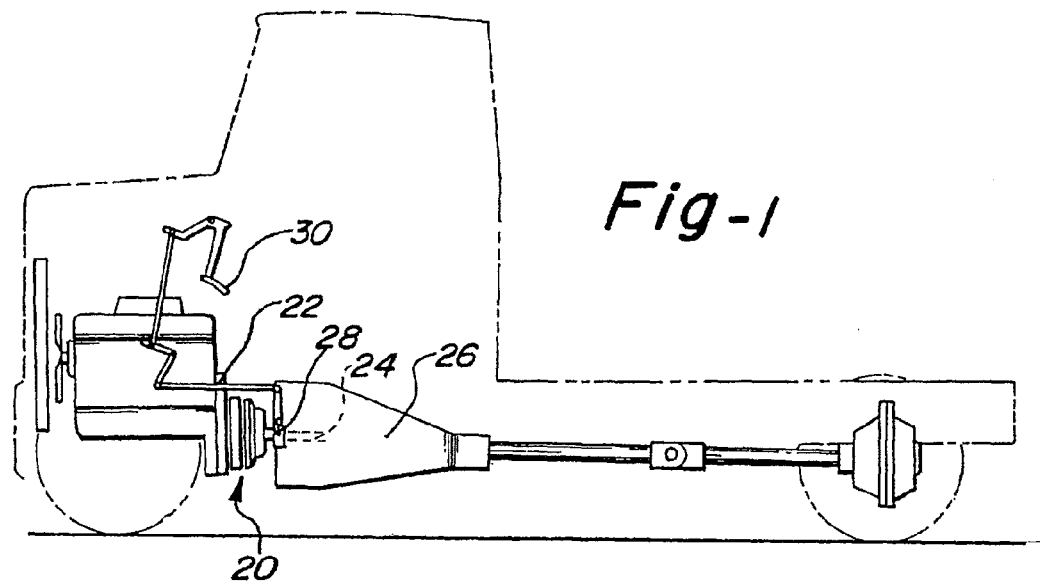
FIG. 1 is a partial phantom view illustrating an automatically adjusting clutch mounted in a heavy duty vehicle.

FIG. 1 illustrates a heavy duty clutch 20 that selectively transmits torque from an engine flywheel 22 to a driven shaft 24 of a vehicle transmission 26. The flywheel 22 is the driving member providing torque which is selectively transmitted to the transmission 26. A standard clutch release assembly 28 is employed for affecting clutch disengagement from the flywheel 22. Such movement of the release assembly 28 is achieved by depression of a clutch pedal 30 in a vehicle cab C. The clutch pedal 30 is mechanically linked to the release assembly 28. A full stroke of the pedal 30 will fully disengage the clutch 20, moving the release assembly 28 to an extreme right position (in the direction of the arrow R of FIG. 3). In addition to releasing and engaging the clutch through a mechanical linkage as shown in FIG. 1, actuation can be done by electric, pneumatic, or hydraulic control systems to support automated transmission shifting.

Figure 2:
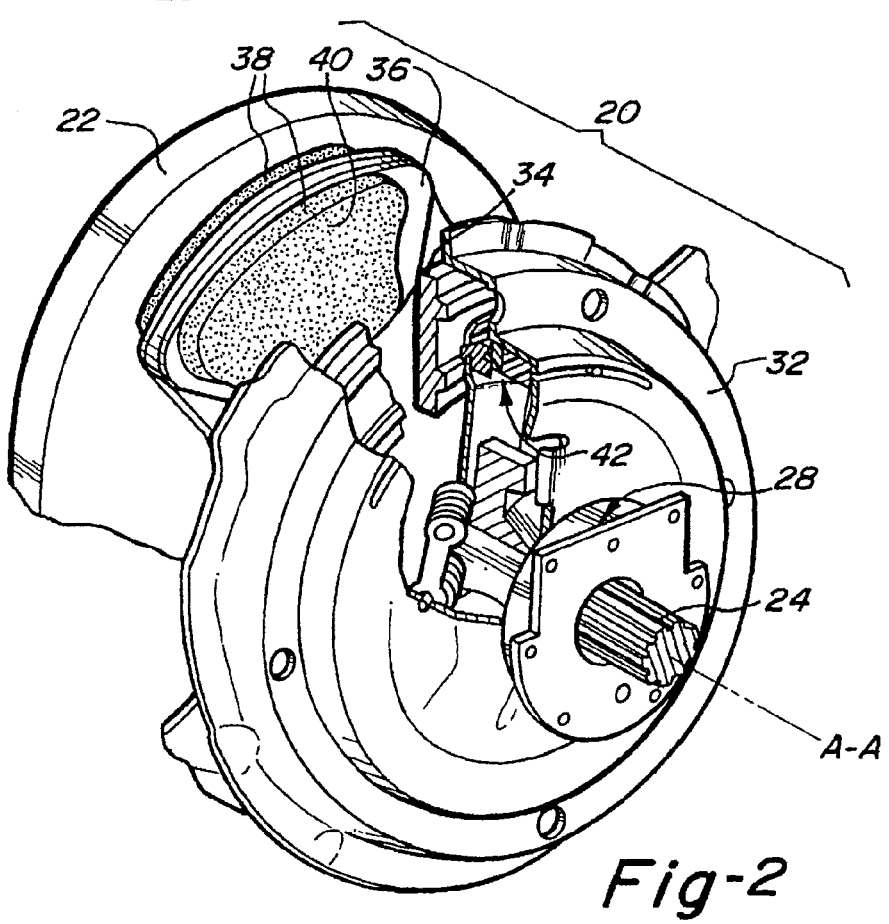
FIG. 2 is a perspective view of the automatically adjusting clutch.
Figure 3:
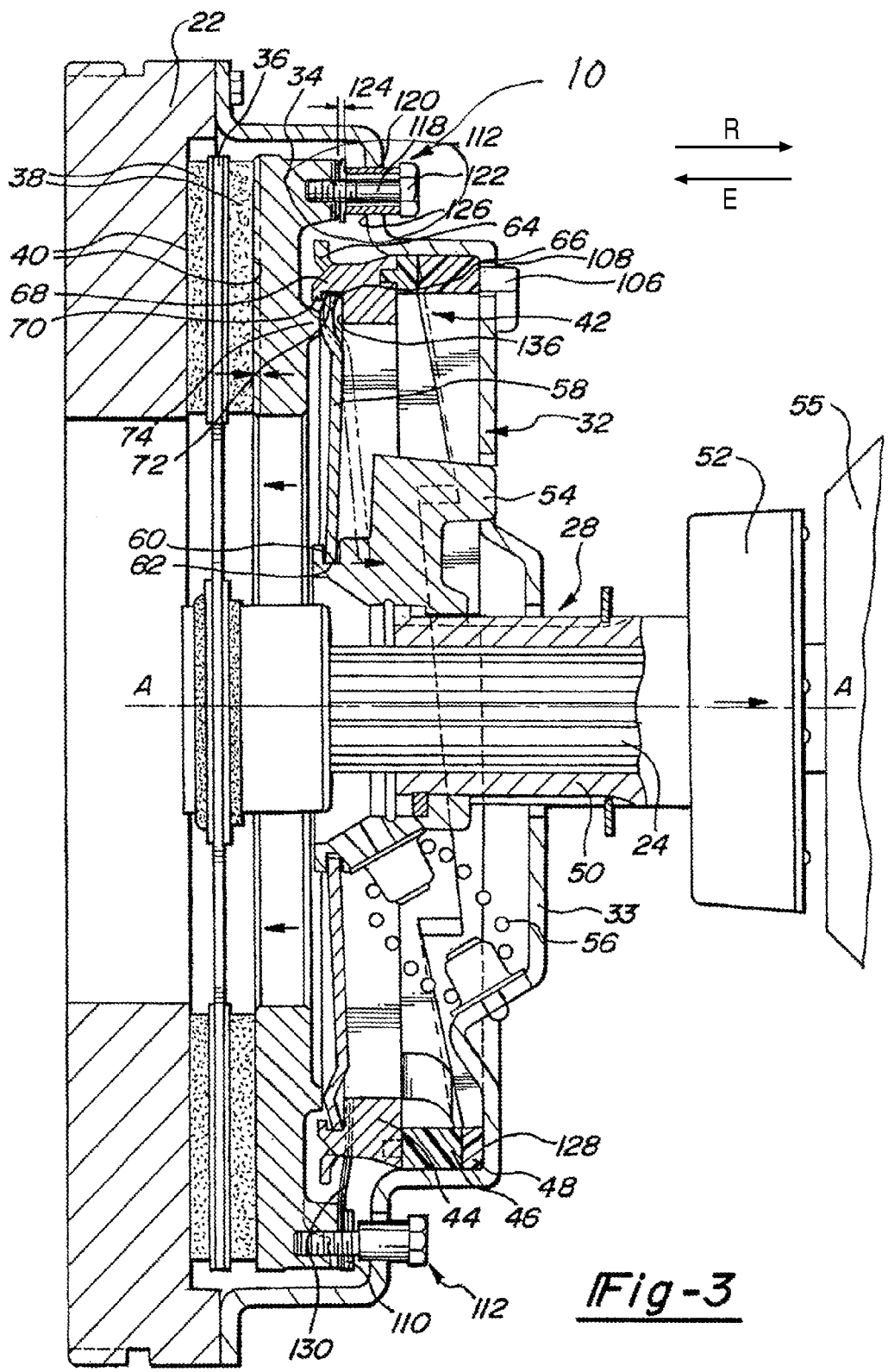
FIG. 3 is a sectional view of the automatically adjusting clutch.

Referring to FIGS. 2 and 3, the flywheel 22 is fixed to a cover 32 for rotation therewith. The cover 32 is in a fixed position relative to the flywheel 22, and includes a radially extending wall 33 which is spaced from the flywheel 22 a fixed distance. A pressure plate 34 and a driven member, or clutch disk, 36 are sandwiched between the flywheel 22 and the cover 32, which rotate about a drive axis A-A. The driven member 36 is rotationally fixed to the axially extending driven shaft 24. As will be apparent to those skilled in the art, the pressure plate 34 is selectively moved to the left (in the direction of the arrow E of FIG. 3) to frictionally engage the pressure plate 34, the driven member 36 and the flywheel 22 to transmit torque from the flywheel 22 to the driven shaft 24. The driven member 36 includes at least one friction pad 38 on each axial side of the driven member. In FIG. 2, the relative thickness of the friction pads 38 is enlarged to emphasize the effect of wear which occurs on a friction surface 40 of each of the friction pads 38 over the life of the clutch 20.

Due to the wear on the friction surface 40, the driven member 36 must be moved to the left (toward the direction of the arrow E) an additional axial distance to engage the flywheel 22. During operation of the clutch 20, and more specifically, when the clutch 20 is fully disengaged, an adjustment mechanism 42 automatically adjusts the clutch 20 to compensate for this wear.

The adjustment mechanism 42 is annular and includes an adjusting ring 44, a left cam ring 46 rigidly secured to the adjusting ring 44, and a right cam ring 48 adjacent the left cam ring 46. The adjustment ring 44, the left cam ring 46 and the right cam ring 48 extend about axis A-A. The adjustment mechanism 42 is mounted to the cover 32 for rotational movement therewith, but is otherwise axially movable within a limited range. As will be described, the right cam ring 48 is mounted for limited rotational movement with respect to the adjusting ring 44, the left cam ring 46, and the cover 32.

The release assembly 28 includes a sleeve 50 positioned circumferentially about the driven shaft 24. A pull assembly 52 is carried by the sleeve 50, and secured at one end thereof. A retainer 54 is secured to the opposite end of the sleeve 50, and positioned circumferentially about the sleeve 50. As shown in FIG. 3, the release assembly 28 contacts a transmission housing 55 when moved to an extreme right position (toward the direction of the arrow R). The transmission housing 55 is a stop for the release assembly 28, and defines the fully disengaged position of the clutch 20. The transmission housing 55 is in a fixed axially spaced location with respect to the flywheel 22, and permits the release assembly 28 to be returned to a control location for adjustment of the clutch 20. Another form of a stop could extend from the cover 32 to provide a control location for axial movement of the release assembly 28, the stop providing an extreme right position for the release assembly 28.

A plurality of coil springs, or clutch biasing members, 56 are interposed between the cover 32 and the retainer 54 forming a spring assembly. As is well known in the art, coil springs 56 urge the retainer 54 in the direction E, or toward an engaged position. To engage and disengage the clutch, a plurality of levers 58 are radially interposed between retainer 54 and adjustment mechanism 42. As more clearly seen in FIG. 8, a radially inner portion 60 of each lever 58 is received in a peripheral groove 62 formed in the retainer 54. A radially outer portion 64 of each lever 58 has an opening 66 which receives a leftwardly (in the direction of the arrow E) projecting pivot extension 68 formed on a left face of the adjusting ring 44. The pivot extension 68 is the extreme left axial end of the adjustment mechanism 42. The pivot extension 68 further includes a radial lip 70 extending radially inwardly. The lip 70 assists in securing the lever 58 to the adjusting ring 44. In this manner, the clutch biasing member 56 biases the pressure plate 34 toward the flywheel 22 when torque is being transferred from the flywheel 22 to the clutch disk 36.

A leftwardly extending projection 72 of the lever 58 is intermediate to the radially inner portion 60 and the radially outer portion 64 of each lever 58. The projection 72 pivotally and pressingly engages an annular shoulder 74 formed on the right side of the pressure plate 34. Thus, leftward movement of the release assembly 28 causes the lever 58 to apply a leftward force on the pressure plate 34 to engage the clutch members 22, 36.

Figure 4:
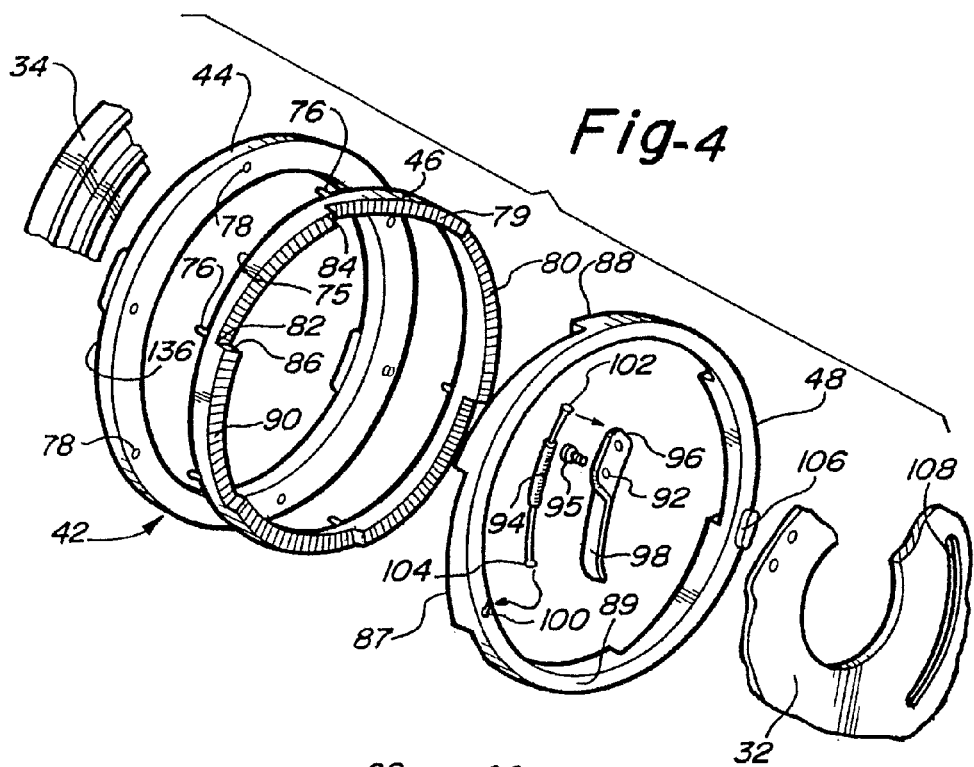
FIG. 4 an exploded perspective view of an adjustment mechanism within the clutch.
Figure 5:
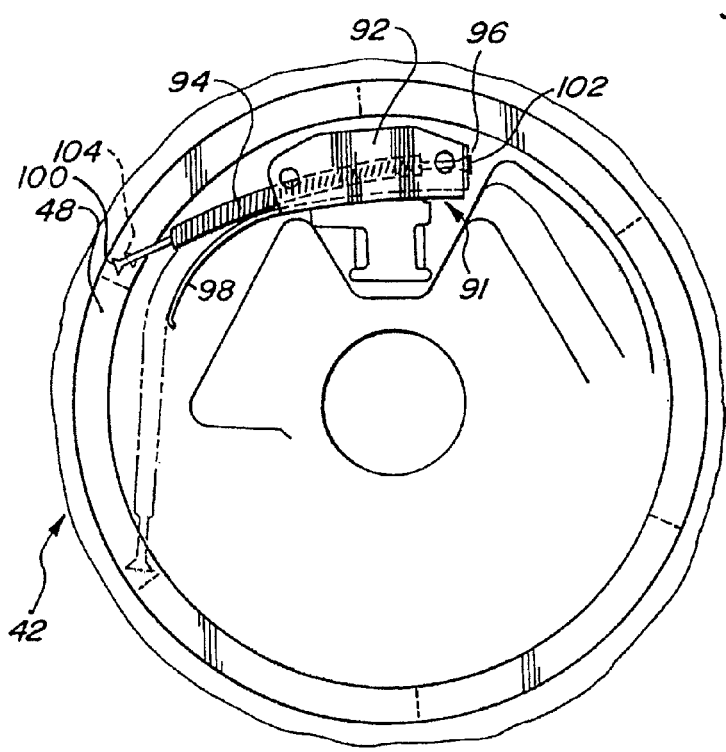
FIG. 5 is a fragmentary plan view of the adjustment mechanism.

Referring now to FIGS. 4 and 5, an axial face 75 of the left cam ring 46 includes a plurality of studs 76 each extending into a corresponding aperture 78 formed in the adjusting ring 44 to fixedly secure the left cam ring 46 to the adjusting ring 44. The adjusting ring 44 and the left cam ring 46 are rotationally fixed to the cover 32, but are otherwise permitted limited axial movement. In contrast, the right cam ring 48 is permitted limited rotational movement with respect to the cover 32.

An axial face 79 of the left cam ring 46, which is opposite the adjusting ring 44, includes a plurality of annular ramps 80. Then ramps 80 extend the full circumferential extent of the left cam ring 46. Each of the ramps 80 extends from a first axial position 82 to a second axial position 84, defining an axially extending ledge 86 in between the ramps 80.

An axial face 87 of right cam ring 48 includes a plurality of annular ramps 88. The opposite axial face 89 of the right cam ring 48 contacts the cover 32. The ramps 88 of the right cam ring 48 contact each ramp 80 of left cam ring 46 and are dimensioned and shaped to conform to the ramps 80 for camming. Further, the contacting surfaces of ramps 80 and 88 include serrations 90. Serrations 90 assist in locking the contacting surfaces together, increasing the frictional resistance between the left cam ring 46 and the right cam ring 48. Therefore, a greater force is required for the right cam ring 48 to rotate with respect to the left cam ring 46 with serrations 90 than without serrations. The serrations 90 may not be desired with all clutches.

The right cam ring 48 is biased to rotate with respect to the cover 32 by a spring assembly 91. The spring assembly 91 includes a bracket 92 and a spring 94. The bracket 92 is secured to the cover 32 by a plurality of rivets 95. The bracket 92 includes a spring seat 96 at one circumferential end and an arm 98 at the other circumferential end. The spring 94 is received radially inward of the right cam ring 48, and extends between the seat 96 of the bracket 92 and a notch 100 formed in the right cam ring 48. The bracket 92 secures one end of the spring 94, and assists in maintaining the spring 94 in a curved orientation, which provides an inner radial clearance. In so doing, the spring 94 may be placed in tension without interfering with other members of the clutch. Preferably, the spring 94 is formed from a continuous coil, wherein each end of the spring 94 is wound to flair outwardly to define a catch plate at each end of the spring 94. One end of the spring 94 forms a first catch plate 102 which is received within the seat 96 of the bracket 92; and the other end of spring 94 forms a second catch plate 104, which is received within the notch 100.

An indicator tab 106 extends from the right cam ring 48 through a circumferentially extending slot 108 in the cover 32. The indicator tab 106 indicates the amount that right cam ring 48 has rotated with respect to the cover 32, thus indicating the amount of adjustment which has occurred within the clutch 20. Further, the indicator tab 106 may be used to re-set the adjustment mechanism 42 when the friction pads 38 are replaced.

As shown in phantom in FIG. 5, counterclockwise rotation of the right cam ring 48 applies a tension to the spring 94. When under tension, the spring 94 applies a biasing force on the right cam ring 48 so that the right cam ring 48 rotates with respect to the left cam ring 46 under conditions required for adjustment. As the right cam ring 48 rotates clockwise, the ramps 80 and 88 cam against each other, moving the adjusting ring 44 from a first axial position to a second axial position, the second axial position being spaced a greater axial distance from the wall 33 of the cover 32 than the first axial position. The camming thereby increases an axial displacement of the left cam ring 46 and the right cam ring 48. The mechanism 42 is designed to stop adjusting when the clutch pads 38 are fully worn. When the clutch pads 38 are fully worn, the tab 106 contacts an end of a slot 108 to prevent further rotation of the right cam ring 48.

Figure 6:
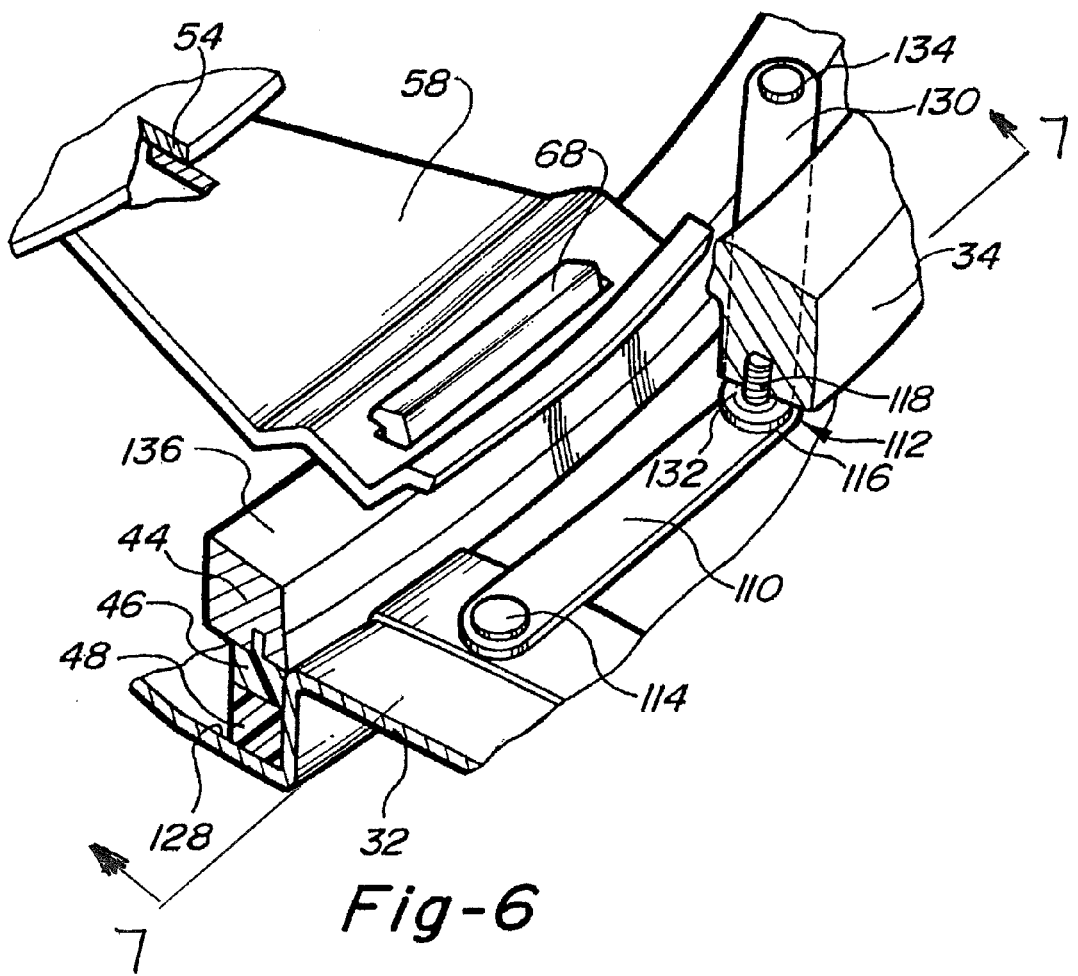
FIG. 6 is a fragmentary perspective view of the automatically adjusting clutch.

As illustrated in FIGS. 3 and 6, the pressure plate 34 is attached to the cover 32 by a plurality of straps 110 and a plurality of pin connection assemblies 112. For convenience, although a plurality of straps 110 and pin connection assemblies 112 are circumferentially spaced about the cover 32, only one set will be described. In the embodiment illustrated, four pin connection assemblies 112 are spaced about 90 degrees apart on the cover 32. Each strap 110 extends in a generally circumferential orientation with respect to the cover 32. A first end 114 of strap 110 is attached to the cover 32, while a second end 116 is attached to the pressure plate 34 at a location spaced from the first end 114. The strap 110 is sufficiently flexible to allow the pressure plate 34 to be moved axially with respect to the cover 32, but is otherwise sufficiently rigid to prevent rotation of the pressure plate 34 with respect to the cover 32.

As more clearly seen in FIGS. 3 and 7, each pin connection assembly 112 includes a pin 118 and a pin housing 120. The pin 118 is threadably received in a radially outer portion of the pressure plate 34. An opposite end of the pin 118 includes an enlarged head 122. The pin housing 120 extends circumferentially about the pin 118 between the pressure plate 34 and the head 122.

A slight clearance 124 is provided between the pin housing 120 and the head 122 of the pin 118 permitting the pressure plate 34 a small amount of relative movement. The pressure plate 34 is thereby freely movable an axial distance defined by clearance 124. During normal operation, the clearance 124 permits sufficient axial movement of the pressure plate 34 with respect to the cover 32 to engage and disengage the clutch 20. The pin housing 120 is received in a generally cylindrical aperture 126 of the cover 32, forming an interference fit between the outer dimension of the pin housing 120 and aperture 126, as discussed in greater detail below. The pressure plate 34 is movable an additional axial distance defined by the axial dimension of the pin housing 120, assuming the force is sufficient to overcome the interference fit between the pin housing 120 and the cover 32 and move the pin housing 120 in the direction of the arrow E. In the embodiment illustrated, the cover 32 is a stamped assembly, although in other embodiments the cover 32 may include a cast portion with the apertures 126 formed therein.

FIG. 7 illustrates a radial cross-section of pin connection assembly 112 and strap 110. The clutch 20 is shown in the disengaged position, so clearance 124 is between head 122 of the pin 118 and the pin housing 120.

Referring again to FIGS. 3 and 6, the adjustment mechanism 42 is seated in an annular cavity 128 formed in the cover 32 and secured to the cover 32 by a strap 130. For convenience, although a plurality of straps 130 are circumferentially spaced about the cover 32, only one will be described. Each strap 130 extends in a generally circumferential orientation with respect to the cover 32. A first end 132 of each strap 130 is attached to the pressure plate 34 by a pin 118, while a second end 134 is attached to an axial face 136 of the adjusting ring 44 at a location spaced from the first end 132. Further, the second end 134 of each strap 130 is located radially inwardly of the first end 132. Each strap 130 is sufficiently flexible to allow adjusting ring 44 to be moved axially with respect to the cover 32 and the pressure plate 34, but is otherwise sufficiently rigid to prevent rotation of adjusting ring 44 with respect to the cover 32. The right cam ring 48, which is not directly secured to the adjusting ring 44 or the left cam ring 46, is sandwiched between the cover 32 and the left cam ring 44.

The straps 130 serve an additional purpose which is to bias the adjusting ring 44 towards the lever 58 (in the direction of the arrow E in FIG. 3). Thus, the axial face 136 of the adjusting ring 44 applies a force on lever 58 in the direction of the arrow E. Such force maintains the lever 58 in contact with the pressure plate 34. Therefore, if the release assembly 28 is moved to an extreme right position (in the direction of the arrow R in FIG. 3), a gap will be created between left cam ring 46 and right cam ring 48, as opposed to lever 58 and the pressure plate 34. The significance of this will become apparent once the interaction of the lever 58 and the adjustment mechanism 42 ring is understood.

Figure 10:
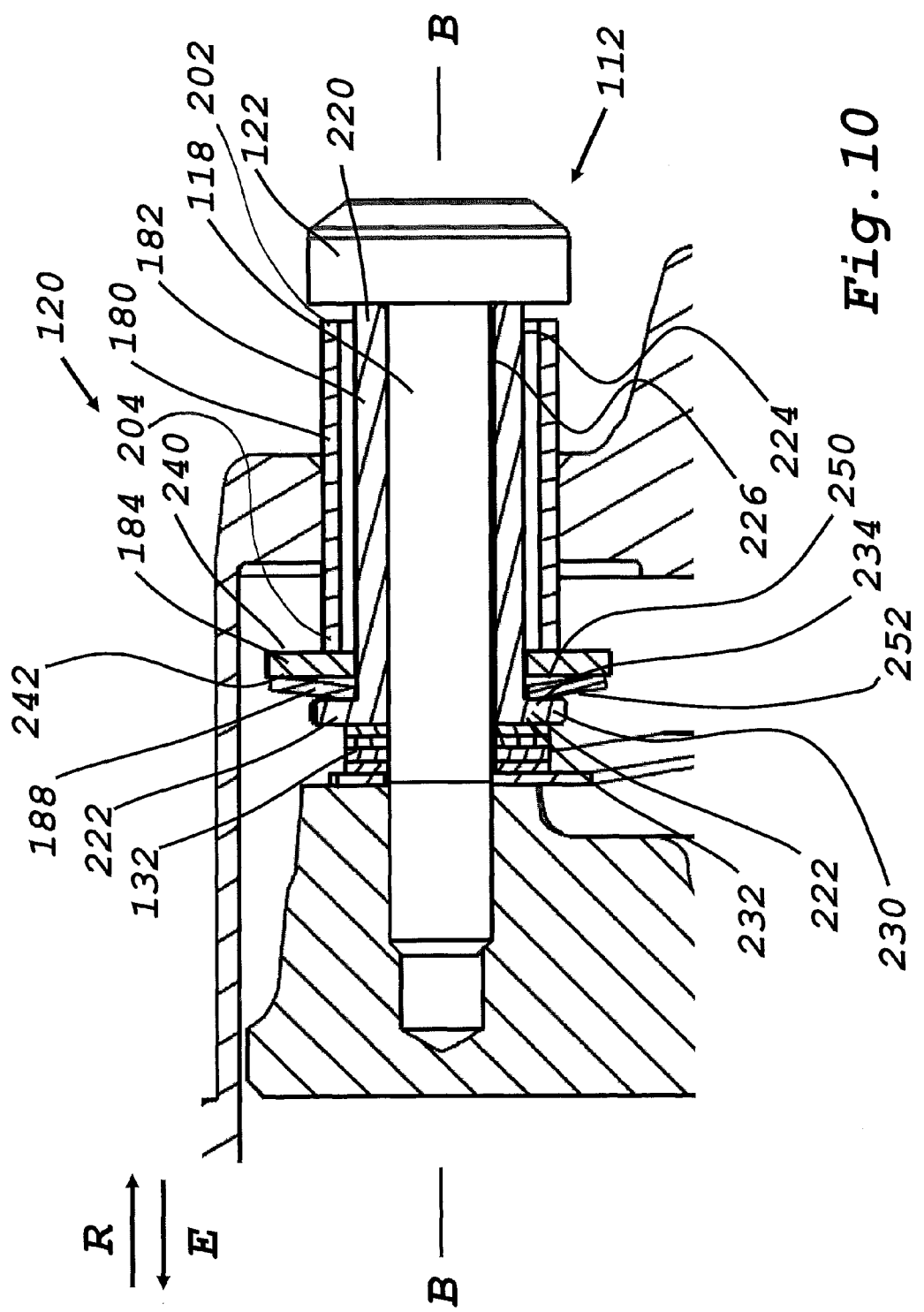
FIG. 10 is an enlarged view of area 10 of FIG. 3, according to an embodiment.

FIGS. 10, 11, and 12 illustrate the pin connection assembly 112 in greater detail. The pin connection assembly 112 includes a generally tubular control sleeve, or first member, 180, a flanged sleeve, or second member 182, a reaction member 184, and a biasing member 188, generally defining an axis B-B.

As best seen in FIG. 11, the control sleeve 180 includes a first end 202, a second end 204, a generally cylindrical outer surface 206, a generally cylindrical inner surface 208, and a break 210 defined by a first surface 212 and a second surface 214. Referring back to FIG. 10, the second member 182 includes a second member first end 220, a second member second end 222, a generally cylindrical outer surface 224, and a generally cylindrical inner surface 226. The second member second end 222 includes a flange 230 extending radially therefrom. The flange 230 includes a flange first end 232 and a flange second end 234.

The reaction member 184 includes a generally annular body having a generally annular reaction first end 240 and a generally annular reaction second end 242. In the embodiment illustrated, the biasing member 188 is a Belleville or spring washer and includes a generally frusto-conical first surface 250 and a generally frusto-conical second surface 252, although other suitable biasing elements may be used. As is known, a Belleville washer will resiliently exert an axial biasing force when physically deformed.

The control sleeve 180 forms a unitary piece radial spring that is biased radially outwardly due to the break 210 when not interposed within an aperture 126 to define an outer diameter larger than the diameter of the aperture 126. Each pin connection assembly 112 is interposed within one of the cover apertures 126 such that the outer surface 206 of the control sleeve 180 is in an interference fit with the aperture 126 as the first surface 212 and the second surface 214 are brought together. That is, when the control sleeve 180 is interposed within an aperture 126, the first surface 212 and the second surface 214 are biasingly urged apart causing the control sleeve 180 to be forced radially toward the aperture 126 to resist axial movement therebetween, thereby requiring an axial force to move the control sleeve 180 axially within the aperture 126.

As discussed in greater detail below, as the clutch friction surface 40 wears, the control sleeves 180 will move axially within the apertures 126 to permit automatic adjustment of the clutch 20 and help ensure that the coil springs 56 will exert a sufficient amount of force on the pressure plate 34 to engage the clutch 20. That is, a distance d (FIG. 7) is maintained since the control sleeve 180 moves in the direction of the arrow E as the friction surfaces 40 wear. The pressure plate 34, when moved toward the control sleeves 180 in the direction of the arrow R, is restrained by the control sleeves 180 in a 'centered' position where the periphery of the pressure plate 34 is generally equidistant from the flywheel 22. This 'centered' position reduces premature wear and drag of the friction pads 38 which may heat the friction pads 38 and reduce the clamping force of the clutch 20. As best seen in FIG. 3, if the control sleeves 180 were not permitted to axially move within the apertures 126, the heads 122 of the pins 118 would restrain the pressure plate 34 from moving sufficiently toward the flywheel to clamp the friction disks 38 as the heads 122 contact the first ends 202 of the control sleeves 180.

The biasing member 188 provides an axial biasing force to force the pressure plate 34 toward the flywheel 22. That is, when the pressure plate 34 moves in the direction of the arrow R, the biasing members 188 are compressed and exert a biasing force in the direction of the arrow E. This biasing force will slow the pressure plate 34 as the pressure plate 34 stops moving in the direction of the arrow R to avoid an undesirably large impact force imparted to the control sleeve 180. If the force exerted by the pressure plate 34 in the direction of the arrow R were to exceed the amount of force required to axially move the control sleeves 180 relative to the cover 32, then the control sleeves 180 may undesirably move in the direction of the arrow R relative to the cover 32.

Figure 13:
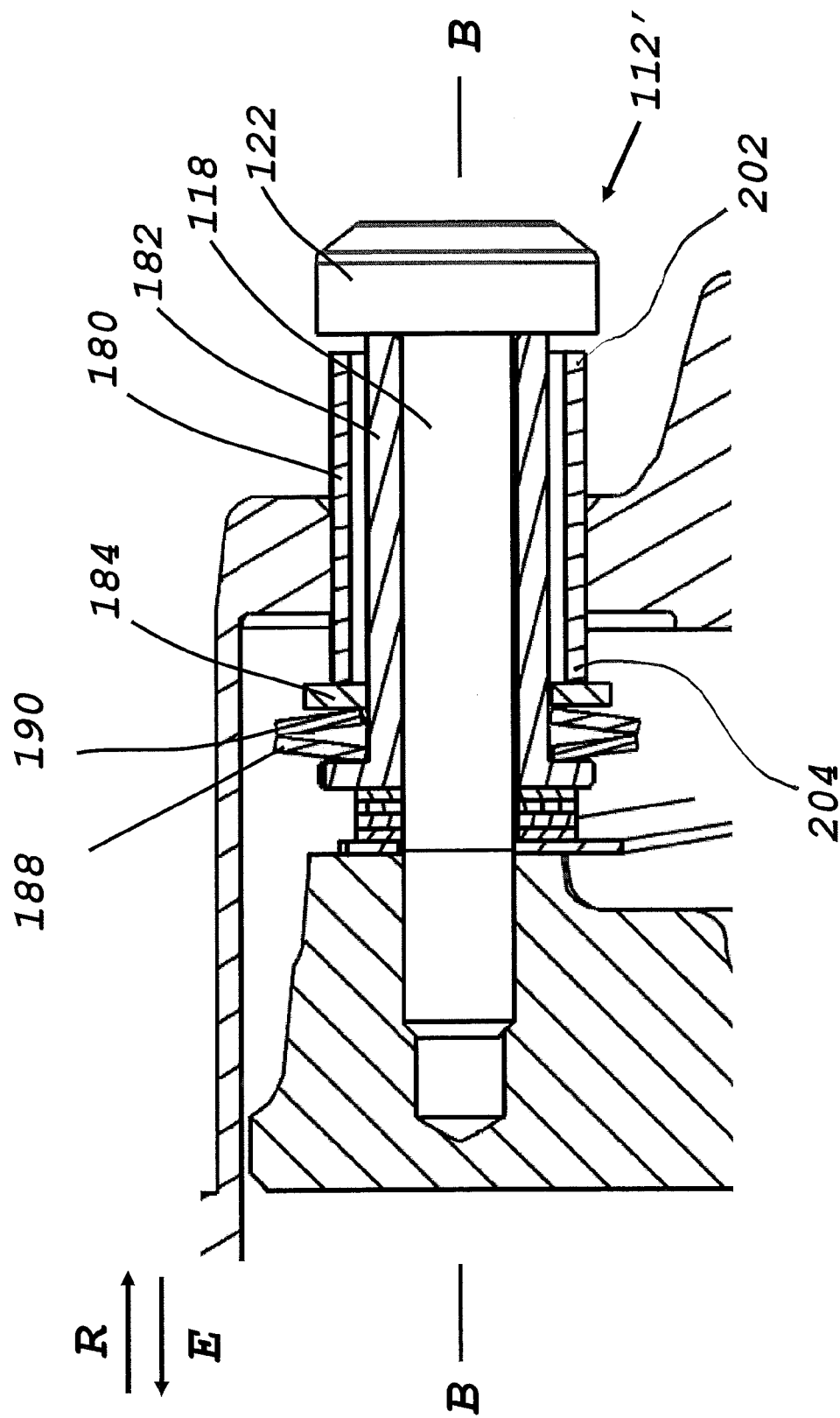
FIG. 13 is an enlarged view of an alternative embodiment of area 10 of FIG. 3, according to an embodiment.

In other exemplary approaches, a plurality of biasing elements may be used with each pin connection assembly 112. One exemplary approach is illustrated in FIG. 13 in an alternative embodiment. In FIG. 13, the pin connection assembly 112' includes a second biasing member 190 which may increase the amount of biasing force. Further, the biasing member 188 and the second biasing member 190 may provide a greater distance of travel for compressions of the members 188, 190, when compared to the embodiment of FIG. 10.

A second alternative embodiment is illustrated in FIG. 14. In FIG. 14, each control pin assembly 312 includes a generally tubular control sleeve, or first member, 380, a flanged sleeve, or second member 382, a reaction member 384, and a biasing member 388, generally defining an axis C-C.

The control sleeve 380 includes a first end 402, a second end 404, and a break (not shown, but similar to the break 210). The second member 382 includes a generally cylindrical outer surface 406, a generally cylindrical inner surface 408, and a generally annular groove 426 formed in the inner surface 408. The second member 382 includes a flange 430 extending radially therefrom. The flange 430 includes a flange first end 432, a flange second end 434, and a flange shoulder 436. A limiting member 438 is partially interposed within the groove 426.

The reaction member 384 includes a generally annular body having a generally annular reaction first end 440 and a generally annular reaction second end 442. In the embodiment illustrated, the biasing member 388 is a Belleville or spring washer and includes a generally frusto-conical first surface 450 and a generally frusto-conical second surface 452, although other suitable biasing elements may be used. As is known, a Belleville washer will resiliently exert an axial biasing force when physically deformed.

The axial thickness of the flange shoulder 436 is greater than the thickness of the biasing member 388 (measured between the first surface 450 and the second surface 452. Accordingly, the biasing member 388 cannot be fully axially compressed. The relative axial thicknesses of the biasing member 388 and the flange shoulder 436 may be selected to provide a desired amount of axial limitation for the biasing member 388.

In the embodiment illustrated the limiting member 438 is a snap ring that extends radially from the groove 426 to axially restrain the reaction member 384 from movement in the direction of the arrow R. In one embodiment of installing the limiting member 438 in the groove 426, the biasing member 388 is axially compressed between the flange 430 and the reaction member 384. Then, the limiting member 438 is partially interposed within the groove 426. After the reaction member 384 is urged in the direction of the arrow R to contact the limiting member 438, the biasing member 388 remains deformed to provide a preload on the biasing member 388, if desired.

During operation, the shoulder 436 limits the compression of biasing member 388 to improve fatigue resistance. The groove 426 and limiting member 438 allow preloading the biasing member 388 to better absorb the impact of pressure plate 34 during a rapid movement in the direction of arrow R that results in the pressure plate 34 impacting the control pin assemblies 312 with sufficient force to move the control sleeves 380 in the direction R relative to the cover 32 in the absence of the biasing members 388.

The control sleeve 180 forms a unitary piece radial spring that is biased radially outwardly due to the break when not interposed within an aperture 126 to define an outer diameter larger than the diameter of the aperture 126. Each pin connection assembly 312 is interposed within one of the cover apertures 126 such that the outer surface 406 of the control sleeve 380 is in an interference fit with the aperture 126. That is, when the control sleeve 380 is interposed within an aperture 126, an axial force is required to move the control sleeve 380 axially within the aperture 126.

As best seen in FIG. 3, the clutch 20 is disengaged by movement of the release assembly 28 in the direction R, and more specifically, movement of retainer 54 in the direction R. A fully disengaged position of the clutch 20 is defined as the position when the release assembly 28 contacts a stop, such as the inertia brake of the transmission housing 55. In an initial condition of the clutch 20, prior to wear on friction surface 40 of the driven member 36, the retainer 54 moves a constant distance from the engaged position to the fully disengaged position of the clutch 20. Similarly, the pressure plate 34 moves a constant distance from an engaged position to a disengaged position. In this exemplary embodiment, the distance of travel for the pressure plate 34 is approximately 0.040 to 0.060 inch (1.02 to 1.52 mm), assuming no wear on the friction pads 38. As discussed in greater detail herein, the pin assembly 112 permits the pressure plate 34 to move this distance, due to the clearance 124 (FIG. 7).

After wear has occurred on the friction pads 38, the pressure plate 34 must move an additional axial distance in the direction E to engage the clutch 20 (due to interference between the heads 122 of the pins 118 and the control sleeves 180). This additional increment of travel is shown as "d" (when comparing the position of the pressure plate 34 to the position of the cover 32 illustrated in phantom in FIG. 7). In this intermediate condition of the clutch 20, the axial movement of the pressure plate 34 exceeds the clearance 124 provided by the pin assemblies 112. Therefore, in order for the pressure plate 34 to move the additional distance "d", the control sleeves 180 are moved an axial distance "d" in the direction E relative to cover 32. The head 122 of the pin 118 applies a force on the control sleeves 180, as seen in FIG. 3, to move the control sleeves 180 in the direction E. The control sleeves 180 may then move axially in the direction of the arrow E relative to the cover 32 because the force of the coil springs 56 exceeds the resistance of the interference fit between the control sleeves 180 and the cover 32. The clutch

20 will continue to operate at this position, and will remain unadjusted until the release assembly 28 is moved to a fully disengaged position. During operation, the control sleeves 180 restrict the movement of the pressure plate 34 in the direction of the arrow R, even if the biasing members 188 are compressed, during each clutch disengagement.

As seen in FIG. 7, the pre-adjusted position of the cover 32 relative to the pressure plate 34 is shown in phantom. The force of the interference fit between each control sleeve 180 and the cover 32 is sufficient to prevent the control sleeves 180 from moving axially to the right (in the direction of the arrow R) with respect to the cover 32 during clutch disengagement (when the pressure plate 34 is moved in the direction of the arrow R such that the pressure plate will exert a force on the control sleeves 180). This is due to the relatively weak force which is applied for movement of the pressure plate 34 in the direction R and the axial compliance of the biasing members 188. In contrast, the force applied by coil springs 56 on the pressure plate 34 in the direction E is much greater, which may ensure that the control sleeves 180 will always move in the direction E during operation. Accordingly, the axial compliance of the biasing members 188 may prevent the control sleeves 180 from moving in the direction of the arrow R relative to the cover 32 even during rapid disengagement of the clutch 20.

With an automated actuation system such as the electronic clutch actuator (ECA), the force exerted on the pressure plate 34 to move the pressure plate 34 in the direction of the arrow R may exceed the force applied manually by a user. In the absence of the biasing members 188, the pin connection assemblies 112 are not provided with the aforementioned axial compliance. Accordingly, when the pressure plate 34 is moved in the direction of the arrow R during clutch disengagement, the pressure plate 34 may cause the control sleeves 180 to move slightly in the direction of the arrow R. As the pressure plate 34 moves in the direction of the arrow E during clutch engagement, the control sleeves 180 may be moved in the direction of the arrow E. If the control sleeves 180 are permitted to move in both directions, the interference fit between the control sleeves 180 and the aperture 126 may cause fretting which may result in an increased amount of force required to move the control sleeves 180 axially within the aperture 126. The inventor has discovered that this increased amount of force required to move the control sleeves 180 axially within the aperture 126 may reduce the amount of force that the coil springs 56 exert on the friction pads 38, thereby causing the clutch 20 to slip briefly following a rapid engagement. Accordingly, the axial compliance of the biasing members 188 reduces clutch slip and fretting between the control sleeves 180 and the apertures 126 of the cover 32.

During adjustment, the pressure plate 34 exerts a force on the second end 204 of each control sleeve 180 (through the flange 230, the biasing member 188 and the reaction member 184) when the release assembly 28 is moved to the fully disengaged position (in the direction of the arrow R). The control sleeves 180 may then prevent further movement of the pressure plate 34 in the direction of the arrow R. The strap 130 applies a biasing force on adjusting ring 44 towards the pressure plate 34. This biasing force moves the adjusting ring 44 and left cam ring 46 in the direction of the arrow E, creating gap "d". Gap "d" is created between left cam ring 46 and right cam ring 48.

In response to the gap "d," the right cam ring 48 rotates with respect to left cam ring 46 causing camming between ramps 80 and 88. This camming action locks adjusting ring 44 into the position provided by lever 58. In so doing, an extreme left axial end of adjustment mechanism is moved from a first position to a second position, the second position being spaced a greater axial distance from the cover 32 than the first position.

Figure 9A:
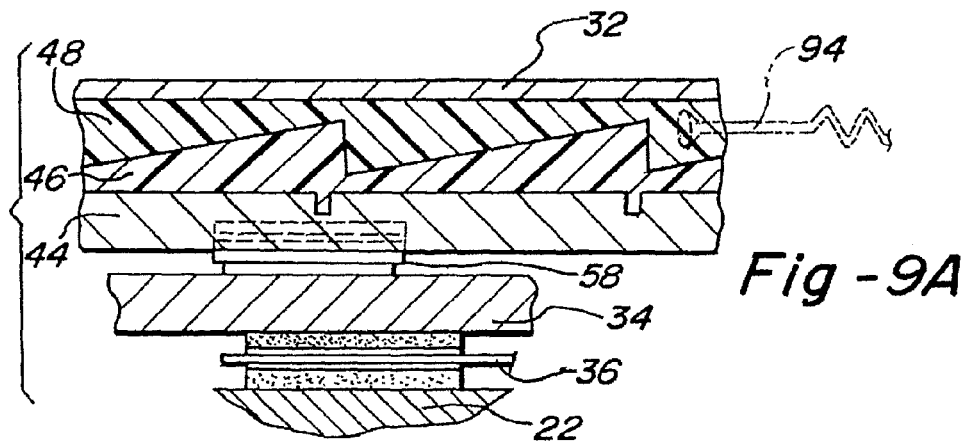
FIG. 9A is a partial radial cross-sectional view of the clutch shown in an engaged position.
Figure 9B:
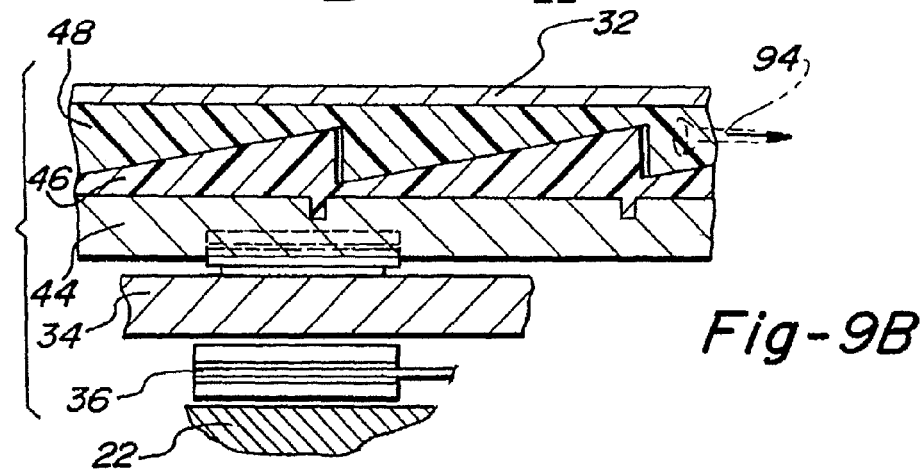
FIG. 9B is a partial radial cross-sectional view of the clutch shown in an intermediate disengaged position prior to adjustment.
Figure 9C:
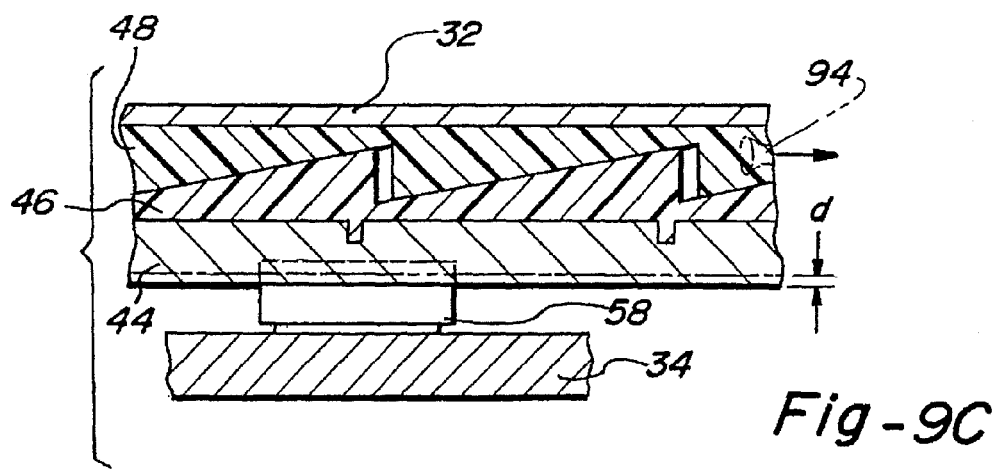
FIG. 9C is a partial radial cross-sectional view of the clutch shown in a fully disengaged position after adjustment.

Referring now to FIGS. 9A-9C, the camming action of adjustment mechanism 42 is illustrated from another cross-sectional view. Radial cross-sections of the relative position of the clutch members are shown before and after adjustment. The clutch is shown in an engaged position in FIG. 9A, after wear has occurred on friction surface 40 of driven member 36. Because of wear on friction surface 40, the pressure plate 34 has moved an additional axial distance in order to engage driven member 36 with flywheel 22.

The clutch is shown in an intermediate disengaged position in FIG. 9B. In this intermediate position, adjustment mechanism 42 has not yet been activated to adjust the clutch 20 in response to the wear on friction surface 40. The clutch will operate unadjusted until it is fully disengaged.

The clutch 20 is shown in the fully disengaged position in FIG. 9C after adjustment. When the clutch 20 is fully disengaged, pull assembly 52 of the release assembly 28 contacts transmission housing 55, which is the extreme right position for the release assembly 28, as shown in FIG. 3. The radially outer portion 64 of lever 58 leverages adjusting ring away from the cover 32, and creates a gap between left cam ring 46 and right cam ring 48. The biasing forces on right cam ring 48 caused by spring 94 urges the rotation of right cam ring 48. This, in turn, results in camming along ramps 80 and 88 to increase the axial displacement of adjustment mechanism 42 to fill the gap.

This action repeats each time sufficient wear has occurred on friction surface 40 to permit relative rotation of the left cam ring 46 and the right cam ring 48, and when the clutch 20 is fully disengaged. Further, this adjustment action occurs automatically during normal operation of the clutch.

Numerous advantages are achieved by the use of a clutch having the automatic adjustment mechanism as described. The adjustment of the clutch is automatically set each time the clutch is fully disengaged. The adjustment is a direct function of increased movement of the pressure plate 34 due to wear on friction surfaces, which is triggered by a pin or pin assembly that cooperates with the pressure plate 34. The increment of wear on the friction surface of driven member is directly translated into a gap between the annular cam rings, each having contacting camming surfaces. The annular cam rings cam against each other when the clutch is fully disengaged to displace this gap. Therefore, the clutch automatically adjusts over the life of the clutch and operates at peak efficiency. The adjustment mechanism is internal to the clutch, and therefore not subject to the external environment which could cause damage to the components.

The exemplary embodiment of the clutch 20 automatically compensates for wear on the mechanical linkage between clutch pedal 30 and the release assembly 28, as well as within an automated clutch actuation system. In addition the clutch will automatically set clutch brake squeeze and compensate for wear on the clutch inertia brake throughout the life of the clutch.

The embodiment may include the wear indicator tab so that an operator is aware of how much adjustment has taken place, and can estimate the remaining life of the clutch. This visual indicator is outside the clutch, and provides this information without disassembly of the clutch. Further, the adjustment mechanism compensates for manufacturing variations in the cover assembly allowing the clutch to be initialized upon the first full disengagement.

Further, in the first embodiments the set of straps which secure the pressure plate 34 to the adjustment mechanism also maintains the lever against the pressure plate 34. Therefore, noise is reduced or eliminated due to vibration that may otherwise occur between the pressure plate 34 and the lever. Further, wear on the shoulder 74 of the pressure plate 34 is reduced due to the decreased vibration of lever 58.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A torque transmitting apparatus comprising:
    a cover generally defined by a first axis, wherein the cover includes at least one adjustment aperture;
    a flywheel coupled to the cover for rotation therewith, wherein the flywheel is restrained from axial movement relative to the cover;
    a pressure plate coupled to the cover for rotation therewith, wherein the pressure plate is axially moveable relative to the cover;
    a clutch disk at least partially interposed between the flywheel and the pressure plate;
    a pin connection assembly passing between the pressure plate and the cover in the adjustment aperture of the cover, the connection assembly including a pin and a control sleeve extending around the pin;
    wherein the control sleeve defines a break extending longitudinally along the control sleeve, the break being defined by a first surface and a second surface; further wherein an outer surface of the control sleeve is in an interference fit with the aperture whereby the first and second surfaces are moved apart to allow the control sleeve to exert a biasing outward radial force on the aperture to resist axial movement therebetween;
    at least one biasing member, wherein the biasing member is interposed between the control sleeve and the pressure plate, and the biasing member exerts a biasing axial force on the pressure plate, thereby biasing the pressure plate toward the flywheel and further resisting axial movement of the control sleeve, the control sleeve within the aperture and the biasing member each contributing to an overall axial biasing within the pin connection assembly;
    at least one reaction member extending between the control sleeve and the biasing member to exert an axial biasing force upon deformation;
    a flanged member extending around the pin between the pin and the control sleeve, the flanged member having a flange first end and a flange second end; and
    a flange extending radially from the flange second end and engaging the biasing member.

2. The apparatus of claim 1, further comprising a strap interconnecting the pressure plate and the cover, wherein the strap extends circumferentially and axially between the pressure plate and the cover for providing a biasing force therebetween.

3. The apparatus of claim 1, wherein the pin extends through the biasing member.

4. The apparatus of claim 1, wherein the control sleeve moves toward the flywheel as the clutch disk is reduced in axial thickness through wear.

5. The apparatus of claim 4, wherein the pressure plate, when in an engaged position, moves toward the flywheel as the clutch disk is reduced in axial thickness through wear, and wherein the movement of the pressure plate toward the flywheel is about equal to the movement of the control sleeve toward the flywheel.

6. The apparatus of claim 1, further comprising a clutch biasing member for biasing the pressure plate toward the flywheel when torque is being transferred from the flywheel to the clutch disk.

7. The apparatus of claim 1, wherein the reaction member includes at least one generally annular body.

8. The apparatus of claim 1, wherein the axial biasing of the control sleeve and biasing member further prevents at least one of clutch slip and fretting between the control sleeve and aperture.

9. A torque transmitting apparatus comprising:
    a cover generally defined by a first axis, wherein the cover includes at least one adjustment aperture;
    a flywheel coupled to the cover for rotation therewith, wherein the flywheel is restrained from axial movement relative to the cover;
    a pressure plate coupled to the cover for rotation therewith, wherein the pressure plate is axially moveable relative to the cover;
    a pin connection assembly passing between the pressure plate and the cover in the adjustment aperture of the cover, the connection assembly including a pin and a control sleeve extending around the pin,
    wherein the control sleeve defines a break extending longitudinally along the control sleeve, the break being defined by a first surface and a second surface, further wherein an outer surface of the control sleeve is in an interference fit with the aperture whereby the first and second surfaces are moved apart to allow the control sleeve to exert a biasing outward radial force on the aperture to resist axial movement therebetween;
    at least one biasing member, wherein the biasing member is interposed between the control sleeve and the pressure plate, and the biasing member exerts a biasing axial force on the pressure plate, thereby biasing the pressure plate toward the flywheel and further resisting axial movement of the control sleeve, the control sleeve within the aperture and the biasing member each contributing to an overall axial biasing within the pin connection assembly;
    a reaction member extending between the control sleeve and the biasing member to exert an axial biasing force upon deformation, wherein the reaction member includes a generally annular body;
    a flanged member extending around the pin between the pin and the control sleeve, the flanged member having a flange first end and a flange second end; and
    a flange extend radially from the flange second end and engaging the biasing member,
    wherein the biasing member extends between the reaction member and the flange.

10. A torque transmitting apparatus comprising:
a cover generally defined by a first axis, wherein the cover includes at least one adjustment aperture;
a flywheel coupled to the cover for rotation therewith, wherein the flywheel is restrained from axial movement relative to the cover;
a pressure plate coupled to the cover for rotation therewith, wherein the pressure plate is axially moveable relative to the cover;
a clutch disk at least partially interposed between the flywheel and the pressure plate;
a pin connection assembly passing between the pressure plate and the cover in the adjustment aperture of the cover, the connection assembly including a pin and a control sleeve extending around the pin,
wherein the control sleeve defines a break extending longitudinally along the control sleeve, the break being defined by a first surface and a second surface; further wherein an outer surface of the control sleeve is in an interference fit with the aperture whereby the first and second surfaces are moved apart to allow the control sleeve to exert a biasing outward radial force on the aperture to resist axial movement therebetween;
at least one biasing member, wherein the biasing member is interposed between the control sleeve and the pressure plate, and the biasing member exerts a biasing axial force on the pressure plate, thereby biasing the pressure plate toward the flywheel and further resisting axial movement of the control sleeve, the control sleeve within the aperture and the biasing member each contributing to an overall axial biasing within the pin connection assembly;
at least one reaction member extending between the control sleeve and the biasing member to exert an axial biasing force upon deformation;
a flanged member extending around the pin between the pin and the control sleeve, the flanged member having a flange first end and a flange second end; and
a flange extending radially from the flange second end and engaging the biasing member;
wherein the biasing member extends between the reaction member and the flange.

\* \* \* \* \*